United States Patent [19]

Sekiguchi et al.

[11] Patent Number: 4,980,227
[45] Date of Patent: Dec. 25, 1990

[54] NETLIKE SHEET AND METHOD FOR PRODUCING MULTILAYER YARN FOR PRODUCING THE SAME

[75] Inventors: Keji Sekiguchi, Uozu; Takashi Fukushima, Shimoniikawa, all of Japan

[73] Assignee: Diatex Co., Ltd., Tokyo, Japan

[21] Appl. No.: 203,718

[22] Filed: Jun. 2, 1988

[30] Foreign Application Priority Data

Jun. 3, 1987 [JP] Japan ................ 62-139120

[51] Int. Cl.$^5$ .............. B32B 5/16; D02G 3/00; D04H 1/00
[52] U.S. Cl. .................. 428/241; 428/224; 428/225; 428/226; 428/240; 428/245; 428/255; 428/258; 428/296; 428/372; 428/374; 428/401
[58] Field of Search ........ 57/260, 907; 428/246, 428/245, 373, 374, 372, 401, 221, 224, 255, 240, 241, 225, 296, 198, 258, 257, 259, 236, 237, 247, 226; 264/147, 171

[56] References Cited

U.S. PATENT DOCUMENTS

| | | | |
|---|---|---|---|
| 3,773,609 | 11/1973 | Harata et al. | 427/400 X |
| 3,808,027 | 4/1974 | Anderson et al. | 428/400 X |
| 4,356,234 | 10/1982 | Kumakawa et al. | 428/400 X |
| 4,522,884 | 6/1985 | Brody | 428/372 X |

FOREIGN PATENT DOCUMENTS 53-49902  11/1978  Japan .

*Primary Examiner*—Lorraine T. Kendell
*Attorney, Agent, or Firm*—Wegner, Cantor, Mueller & Player

[57] ABSTRACT

A netlike sheet comprises woven warp and weft yarns, either the warp yarns or the weft yarns being a five-layered yarn composed of two stretched layers of polyolefin resin and layers of polyolefin resin having a melting point lower than that of the former disposed between the two stretched layers and on the outer surfaces thereof and the other being the same the five-layered yarn or a three-layered yarn composed of a central stretched layer of polyolefin resin and layers of polyolefin resin having a melting point lower than that of the former, which are disposed on both side of the stretched layer, the warp and weft yarns being heat bonded at intersections of these yarns. The netlike sheet exhibits good stiffness and excellent retention of sheet-like shape and the meshes of the net are stable during using the same.

10 Claims, 1 Drawing Sheet

NETLIKE SHEET AND METHOD FOR PRODUCING MULTILAYER YARN FOR PRODUCING THE SAME

BACKGROUND OF THE INVENTION

(1) Field of the Invention

The present invention relates to a netlike sheet wide by utilizable as a material for making, for example, light shielding nets, sheets for civil engineering applications, sheets for fruit containers, sheets for drying cereals, and various kinds of reinforcing materials, and to a method for producing a multilayer yarn for making such netlike sheet.

(2) Prior Art

It has been known that woven fabrics can be produced from multilayer yarns composed of stretched yarns of thermoplastic synthetic resins provided thereon with layers of thermoplastic synthetic resins which have a melting point lower than that of the thermoplastic synthetic resin used in making the stretched yarn. For instance, Japanese Utility Model Publication No. 53-49902 discloses a process in which a woven fabric is woven from multilayer yarns of this type and the outer thermoplastic synthetic resin layers are heated to a temperature higher than the melting point hereof so that the multilayer yarns disposed as warp and weft are adhered to each other in a thermocompression bonding manner to obtain woven sheets.

The warp and weft yarns used in such process are composed of multilayer yarns each of which comprises a stretched yarn disposed at the interior thereof and, therefore, the woven sheets produced therefrom are too low in stiffness for use as light shielding nets, sheets for civil engineering applications and various reinforcing materials. Moreover, the low strength creates problems concerning deforming of the woven fabrics during weaving of the yarns into fabrics and/or storing the same, which in turn results in low yield.

In order to eliminate the foregoing problems, it would seem effective to increase the thickness of the stretched yarns and low melting theremoplastic synthetic resin layers constituting the warp and weft yarns. However, such a method is not effective for imparting the desired stiffness to these yarns. This is because if thick stretched yarns should be prepared by the method, non-uniform multilayer yarns would be obtained.

SUMMARY OF THE INVENTION

Accordingly, a primary object of the present invention is to provide a netlike sheet having good stiffness and excellent retention of sheet-like shape.

Another object of the present invention is to provide a method for effectively producing multilayer yarns for use in making such a netlike sheet.

The present invention has been completed on the basis of the finding that the foregoing problems can be effectively eliminated by utilizing, as warp or weft yarns for weaving a netlike sheet, five-layered yarns composed of two stretched layers of polyolefin resin and layers of polyolefin resin having a melting point lower than that of the former disposed between the two stretched layers and on the outer surfaces thereof and that such a multilayer yarn can be efficiently produced by employing an inflation molding method in which a composite die is used.

Consequently, according to one aspect of the present invention, there is provided a netlike sheet comprising woven warp and weft yarns, either the warp yarns or the weft yarns being a five-layered yarn composed of two stretched layers of polyolefin resin and layers of polyolefin resin having a melting point lower than that of the former disposed between the two stretched layers and on the outer surfaces thereof, and the other being the same five-layered yarn or a three-layered yarn composed of a central stretched layer of polyolefin resin and layers of polyolefin resin having a melting point lower than that of the former, which are disposed on both sides of the stretched layer, the warp and weft yarns being heat bonded at the intersections thereof.

According to another aspect of the present invention, there is provided a method for producing a five-layered yarn comprising the steps of: extruding, into a composite die, a first polyolefin resin and a second polyolefin resin so as to form a three-layered film in which the central layer of the film consists of the first resin and the second resin is welded onto both sides of the central layer, the second resin having a melting point lower than that of the first resin; forming the three-layered film into a cylindrical three-layered structure by extruding the same through the composite die using an inflation molding; cutting the film into long tape-like pieces having a desired width; superposing pairs of the tape-like pieces; then heating the superposed pieces to adhere the polyolefin resin layers having low melting point to each other; and stretching the resultant product.

BRIEF DESCRIPTION OF THE DRAWINGS

The present invention will hereunder be described in more detail with reference to the accompanying drawings, wherein.

DESCRIPTION OF THE PREFERRED EMBODIMENTS

Figure 1:
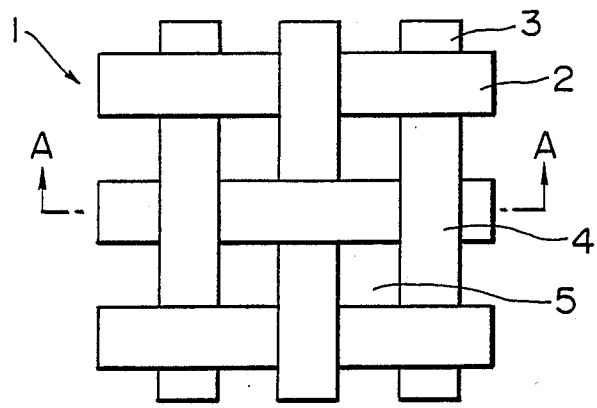
FIG. 1 is a schematic diagram illustrating a netlike sheet according to the present invention.
Figure 2:
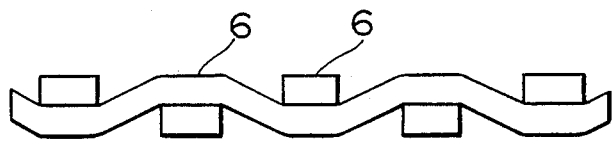
FIG. 2 is a cross sectional view of the netlike sheet shown in FIG. 1, taken along the line A—A.

In the present invention, the stretched layers forming core members of the 5-layer and 3-layer yarns and the layers of polyolefin resin having a melting point lower than the material of core members are both formed from polyolefin resins (such as high density polyethylene, low-density polyethylene, medium-density polyethylene, polypropylene,) polyvinyl chloride, polystyrene, polyvinyl alcohol, polyacrylonitrile, polyvinylidene chloride, polyamide or polyester. In this respects, the low-melting-point thermoplastic synthetic resin layer is formed from a thermoplastic synthetic resin whose melting point is lower, by 15° to 35° C., preferably 20° to 30° C., than that of the resin as the material for the stretched core members. The material for the core members is preferably a high-density polyethylene or polypropylene and the materials for the low-melting-point thermoplastic synthetic resin layers are a low-density polyethylene or polypropylene having a low melting point.

The low-melting-point thermoplastic synthetic resin layers may contain inorganic fillers such as silicon oxide, calcium carbonate, talc, kaolin and the like. Among these, preferred are silicon oxide and calcium carbonate and particularly preferred is silicon oxide. These inorganic fillers may be incorporated into the low-melting-point thermoplastic synthetic resin layer in an amount of 0.1 to 4% by weight (hereinafter simply referred to as "%") and more preferably 0.4 to 3%. If a low-density polyethylene is used as the low-melting-point thermoplastic synthetic resin, it is preferable to add such fillers in an amount of 0.1 to 1%, more preferably 0.4 to 0.6%, while if a polypropylene having a low melting point is used, the content thereof is preferably 1.5 to 3%. The mean particle size of the inorganic fillers is not critical, but is preferably 1 to 8 microns, more preferably 2 to 5 microns. These inorganic fillers may also be incorporated into the core members of the stretched flat yarns.

In a preferred netlike sheet of the invention, the both warp and weft yarns are multilayer yarns having 5-layer structure, which are composed of two stretched layers of polyolefin resin and three layers of low-melting-point polyolefin resin disposed between the two stretched layers and on the outer surfaces thereof. In this respect, the core members (i.e. the two stretched layers) are made from a high-density polyethylene or polypropylene while the low-melting-point resin layers are made from a low-density polyethylene, as mentioned above.

In the netlike sheet of this invention, the materials for obtaining the foregoing two stretched layers may differ from each other. However, it is desirable to form these two layers from the same material from the viewpoint of easy preparation.

In the multilayer yarn having a 5- or 3-layer structure, the stretched layers constituting the core members and the low-melting-point polyolefin resin layers disposed on both sides thereof may have any thickness. However, it is desirable to limit the thickness thereof to 15 to 55 microns and 1 to 5 microns, respectively, and more preferably 20 to 45 microns and 2 to 4 microns. Moreover, said thicknesses in the multilayer yarns are desirably limited to 35 to 130 microns preferably 60 to 90 microns in the yarn with 5-layer structure and to 17 to 65 microns and preferably 30 to 45 microns in the yarn with 3-layer structure. The multilayer yarn may also have any width, but is preferably between 1 and 4 mm wide.

The multilayered flat yarn having 3-layer structure used herein can be produced by welding or adhering the above-described type of low-melting-point thermoplastic synthetic resin layers to both sides of a stretched flat layer provided as a core member. However, it is preferable to form the final yarn by, in a composite die using two extruders, welding a low-melting-point thermoplastic synthetic resin (which may contain inorganic fillers) to both surfaces of a thermoplastic synthetic resin film which is formed into a stretched film during extrusion through a composite die, and extruding the resultant welded film so as so form a laminate film (3-layer film) which is then stretched.

On the other hand, the multilayer yarn having a 5-layer structure can be obtained by welding or adhering, together, two stretched layers serving as core members and three low-melting-point polyolefin resin layers disposed on the outer surfaces of the stretched layers and therebetween. However, it is preferred to form such a multilayer yarn of 5-layer structure by extruding the foregoing multilayer yarn having a 3-layer structure through a composite die to form a laminate film, cutting the extruded multilayer film of 3-layer structure into long tape-like pieces of a desired width, superposing pairs of the tape-like pieces on one another, heating the superposed pieces to adhere the adgacent low-melting-point polyolefin resin layers, thereby forming a flat yarn of 5-layer structure, and finally stretching the 5-layered flat yarn.

The stretching process is carried out because if the yarn is formed in this manner, the inorganic fillers included in the low-melting-point thermoplastic synthetic resin layers tend to be exposed at the outside of the final yarn and the facility with which the flat yarn can be wound is further improved. The core materials can be stretched 4 to 12 times or, preferably, 5 to 8 times the original length. Moreover, the extrusion operation in preparing the 5-layered yarn is preferably carried out by the inflation molding technique whereby multilayer yarn having a cylindrical 3-layer structure is obtained. This makes it possible to easily obtain the superposed pairs of 3-layer structure pieces by simply cutting the same.

The woven netlike sheets of the present invention can be obtained by weaving the aforementioned multilayer yarns as the warp and weft yarns into a fabric using a weaving loom and then heat-welding the warp and weft yarns at the intersections thereof. In this respect, the heat-welding should be carried out at a temperature at which the low-melting-point thermoplastic synthetic resin is molten while the stretched layers acting as the core members are not molten.

In the woven sheets of the present invention, the warp and weft yarns are arranged so that the two adjacent warp yarns and two adjacent weft yarns form square or rectangular spaces having an area of 0.002 to 1.2 $cm^2$, preferably 0.02 to 0.8 $cm^2$.

The present invention thus makes it possible to provide netlike sheets exhibiting high level of stiffness and excellent retention of sheet-like shape. Moreover, the netlike sheets of this invention exhibit an advantage in that the meshes of the net are stable during using the same since the warp and weft yarns are welded with one another at the intersections thereof.

In addition, the method of this invention makes it possible to easily produce multilayer yarns utilizing a die having a simple structure compared with the T-die used in conventional extrusion method.

The present invention will hereunder be described in more detail with reference to the following non-limitative working Examples.

EXAMPLE 1

Figure 3:
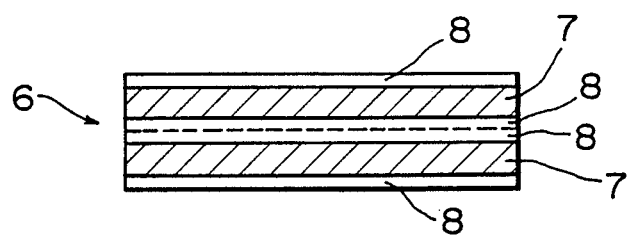
FIG. 3 is a schematic cross sectional view of a multilayer yarn from which the netlike sheet of this invention is produced.

A netlike sheet of the present invention such as that shown in FIG. 1 was manufactured. In FIG. 1, a netlike sheet 1 was obtained by weaving warp yarns 2 and weft yarns 3 having 5-layer structure and heat-welding these warp and weft yarns at the intersections 4 thereof so that spaces 5 were formed between adjacent pairs of warp yarns and adjacent pairs of weft yarns. The warp yarns 2 and weft yarns 3 were formed from the same material. As seen from FIG. 3 (a cross sectional view), the multilayer yarn constituting the warp and weft and having 5-layer structure was composed of two stretched layers 7, 7 and layers 8, 8, 8 of low-melting-point polyolefin resin having a melting point lower than that of the polyolefin resin as the material for the stretched layers, disposed between the two stretched layers and on both outer surfaces thereof.

The stretched layers 7 were produced from a high-density polyethylene (melting point (m.p.) = 134° C.; density = 0.960; and the stretch ratio = 7:1 i.e. 7 times the original length) measuring 35 microns in thickness and 2 mm in width, and the low-melting-point thermoplastic synthetic resin layers 8 were composed of a low-density polyethylene (m.p.=134° C.; density=0.920), measuring 2 microns in thickness and 2 mm in width.

The multilayer yarns used above were prepared by the method described below:

A circular die having a diameter of 200 mm was connected to a core extruder which extruded the high-density polyethylene and a coating extruder which extruded the low-density polyethylene. The low-density polyethylene was introduced into the die, was then divided into two flows therein and was led to both sides of a flow passage through which the high-density polyethylene flowed. The extruded 3-layer film was formed into a cylindrical 3-layer film by the inflation molding technique. The cylindrical 3-layer film was slit into tape-like pieces which were superposed in pairs which were then heat-welded, cooled, stretched by 7 times the original length to form the multilayer yarn of 5-layer structure.

Fabrics were woven from the so-prepared yarns using a weaving loom and, the warp and weft yarns were welded to one another at the intersections thereof in a heat-welded manner. Conditions for the manufacture of the fabrics were as specified below.

(1) Weaving loom used: Water Jet Loom FW 451 manufactured and sold by Nissan Motor Co., Ltd.
(2) Speed of Machine Rotation: 400 rpm
(3) Weaving Width: 130 cm
(4) Cloth Fusion Temperature: 107° C.
(5) Heat Welding Conditions:
 (i) Heat welding temperature: 120° C.
 (ii) Pressure applied: 2 kg/cm$^2$
 (iii) Heating time: 4 sec.
 (iv) Welding width: 15 mm

EXAMPLE 2

The procedures of Example 1 were repeated to form a netlike sheet except for using, as the warp yarn, multilayer yarns having 3-layer structure obtained by welding layers of a low-density polyethylene (m.p.=109° C.; density=0.920; and stretch ratio=7:1) containing 0.5% silicon oxide and measuring 35 microns in thickness and 2 mm in width onto both sides of a stretched layer of a high-density polyethylene (m.p.=109° C.; density=0.960; and stretch ratio=7:1) measuring 35 microns in thickness and 2 mm in width.

The netlike sheets produced in Examples 1 and 2 were found to exhibit an extremely high level of stiffness and excellent retention of sheet-like shape during the manufacture and the storage thereof.

What is claimed is:

1. A netlike sheet comprising woven warp and weft yarns, either the warp yarns or the weft yarns being a five-layered yarn composed of two stretched layers of polyolefin resin each having a thickness of 15–55 microns and an alternating layer of polyolefin resin having a thickness of 1–5 microns and a melting point lower than that of the polyolefin in the stretched layers disposed between the two stretched layers and on the outer surfaces thereof, and the other being the same five-layered yarn or a three-layered yarn composed of a central stretched layer of polyolefin resin and an alternating layer of polyolefin resin having a melting point lower than that of the polyolefin in the central stretched layer disposed on both sides of the stretched layer, the warp and weft yarns being heat bonded at their intersections.

2. A netlike sheet according to claim 1 wherein both warp and weft yarns are multilayer yarns having a 5-layer structure composed of two stretched layers of polyolefin resin and three layers of polyolefin resin having a melting point lower than that of the polyolefin of the stretched yarn, alternatingly disposed between the two stretched layers and on both outer surfaces thereof.

3. A netlike sheet according to claim 1 wherein the width of the multilayer yarn ranges from 1 to 4 mm.

4. A netlike sheet according to claim 1 wherein the stretched layer is formed from a high-density polyethylene or polypropylene, and the alternating layer is formed from a low-melting-point polyolefin resin selected from a low-density polyethylene and polypropylene having a low melting point.

5. A netlike sheet according to claim 1 wherein the melting point of the low-melting-point polyolefin resin is lower than that of the polyolefin resin of the stretched layer by 15° to 35° C.

6. A netlike sheet according to claim 1 wherein the stretch ratio of the stretched layer is 4:1 to 12:1.

7. A netlike sheet according to claim 1 wherein the low-melting-point polyolefin resin layer contains at least one inorganic filler selected from the group consisting of silicon oxide, calcium carbonate, talc and kaolin.

8. A netlike sheet according to claim 7 wherein the inorganic filler is silicon oxide.

9. A netlike sheet according to claim 7 wherein the amount of the inorganic filler ranges from 0.1 to 4% by weight.

10. A netlike sheet according to claim 7 wherein the average particle size of the inorganic filler ranges from 1 to 8 microns.

* * * * *